United States Patent [19]

Shelinbarger, Jr. et al.

[11] Patent Number: 4,917,391
[45] Date of Patent: Apr. 17, 1990

[54] SEALING RING ASSEMBLY

[75] Inventors: Roy E. Shelinbarger, Jr., Wichita; John T. Cherryholmes, Potwin, both of Kans.

[73] Assignee: Aerospace Systems and Components, Inc., Wichita, Kans.

[21] Appl. No.: 218,814

[22] Filed: Jul. 12, 1988

[51] Int. Cl.⁴ .................................................. F16J 9/16
[52] U.S. Cl. ..................................... 277/193; 277/192; 277/216
[58] Field of Search ............... 277/193, 142, 195, 136, 277/198, 138, 216, 170, 194, 143, 192, 139

[56] References Cited

U.S. PATENT DOCUMENTS

| 3,656,766 | 4/1972 | Geffroy | 277/136 |
| 3,917,290 | 11/1975 | Geffroy | 277/75 |
| 4,475,739 | 10/1984 | Nakajima et al. | 277/193 |
| 4,655,983 | 4/1987 | Philby | 277/215 |
| 4,669,736 | 6/1987 | Meijer | 277/216 |
| 4,681,817 | 7/1987 | Shinada | 277/235 A |
| 4,706,971 | 11/1987 | Schirmer | 277/192 |

FOREIGN PATENT DOCUMENTS 810141  3/1959  United Kingdom .................. 277/95

OTHER PUBLICATIONS

Koppers Engineered Products, "Dynamic Sealing: Theory and Practice", Rev. 2/84 pp. Cover and 26–35.

Primary Examiner—William A. Cuchlinski, Jr.
Assistant Examiner—Jeffrey J. Hohenshell
Attorney, Agent, or Firm—Bill D. McCarthy

[57] ABSTRACT

An improved sealing ring assembly in which a three-piece ring seal is provided with a residue deposit groove void to accumulate contaminants to minimize clogging between ring members. Mounted on a piston in a pneumatic valve assembly which is actuated by pressure routing effected by selective solenoid energization, the sealing ring assembly improves the reliability of piston actuation in high temperature, high contaminant service.

14 Claims, 4 Drawing Sheets

SEALING RING ASSEMBLY

BACKGROUND OF THE INVENTION

1. Field of the Invention

The present invention relates to the field of valves and the like, and more particularly but not by way of limitation, to an improved seal ring assembly for operating pressure retention on pistons and the like.

2. Discussion

There are many applications in which valve operation is assisted, or primarily achieved, by use of controlled operating pressure. That is, many valves are actuated by controlled routing of fluid pressure against movable surfaces, such as spool pistons, to effect interaction with valve components to selectively open and close fluid flow ports.

Such fluid operated valves can be found in virtually every industrial area, including aircraft installations using air streams often high in potential contaminants. For example, in high temperature gas turbine pneumatic valving applications, airborne contaminants can combine with particles from the compressor section (e.g. nickel and cobalt alloys) to form compounds that, if leaked past a seal, such as a piston ring seal, can collect in places which can impede the effectiveness of the seal.

Three-piece split ring seal assemblies are commonly used to seal valve pistons and the like, and in high temperature applications the use of graphite rings has found wide acceptance. Such three-piece ring seals comprise a seal ring backed by an inner ring, both of which are in radial juxtapositional contact with a larger backup ring equal in thickness to the combined thicknesses of the seal ring and the inner ring against which the backup ring is disposed. Since it is generally easier to produce accurate sealing surfaces either as flats that can be lapped or as cylindrical surfaces that can be cylindrically ground and lapped, the three-ring seal is a good selection as all the mating surfaces are of this type.

While three-piece ring seals offer advantages, and in many cases present the only positive seal for applications requiring rings less than one inch in diameter, these ring seals have limitations. Airborne contaminants in high temperature applications, such as that mentioned above, can form compounds that collect in between the piston and the ring inside diameter, as well as in the ring gaps. This trapped contamination tends to jam the piston ring, and as a consequence thereof, the flexibility of the ring seal is reduced considerably, if not altogether. This loss of flexibility can result in sticking pistons, or it can increase seal leakage due to the seal's inability to conform to the confining cylinder wall.

Attempts to solve these problems have included the uses of step seal rings; two-piece rings (straight cut inner and step seal outer); and single piece rings with no break or ring gap in conjunction with a multiple piece piston to support the unitary ring. Some designs include loose fitting pistons and seals, and have high pilot port flow to provide forces sufficient for actuation. These valves typically require higher pressures to operate.

Some designs use no seal rings and rely on precision ground, hardened pistons and cylinders to achieve very close fits for leakage control.

None of these prior art seals provides reliable low pressure sealing in a high temperature environment valve application subject to airborne contaminants where low friction, unidirectional sealing is required.

SUMMARY OF INVENTION

The present invention provides a sealing ring assembly which is supportable in a piston groove for sealing contact with a cylinder wall which confines the piston. The sealing ring assembly comprises a seal ring member in external juxtaposition to an inner ring member, both of which are disposed in the piston groove with the seal ring member extensive therefrom for sealing contact with the cylinder wall. The seal ring member and the inner ring member are of equal widths, and a backer ring member is disposed in the piston groove in side juxtaposition to these ring members to overlap the seam therebetween, the backer ring member forming a common sealing surface with the seal ring member against the cylinder wall.

The thickness of the backer ring member is established to be purposefully less than the combined thicknesses of the seal ring member and the inner ring member so as to form a residue deposit groove void behind the backer ring and to maximize the ring land contact area thereby further reducing leakage flow. Reduction in leakage flow proportionately reduces the amount of contaminants that enter the seal void over time. The orientation of the seal ring assembly is established to expose the residue deposit groove void to the high pressure side thereof.

An object of the present invention is to provide a sealing ring assembly which gives improved sealing characteristics in valves subjected to contaminated air or other gases.

Another object of the present invention, while achieving the above stated object, is to provide a seal ring assembly which gives improved sealing characteristics in valves subjected to high temperature, contaminated air and the like.

Other objects, advantages and features of the present invention will become clear from the following detailed description when read in conjunction with the drawings and appended claims.

BRIEF DESCRIPTION OF DRAWINGS

FIG. 4A depicts the gate valve closed to fluid flow.

DESCRIPTION

Figure 1:
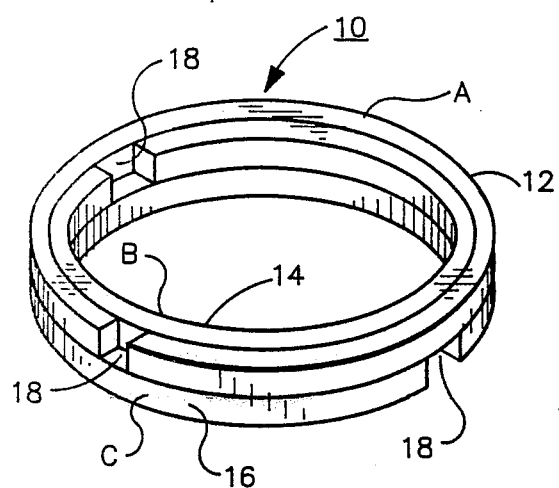
FIG. 1 is a perspective view of a prior art three-piece split ring seal assembly.

Like numerals will be used herein to designate the same components throughout the drawing figures.

Referring to FIG. 1, shown therein is a prior art three-piece ring seal assembly designated by the numeral 10. The ring seal assembly 10, sometimes also referred to as a sealing ring assembly, comprises a seal ring member 12, an inner ring member 14 and a backer ring member 16. For clarity of comparison, these ring members are also designated by alphabetical designation as follows: the seal ring member 12 is also referenced by the letter designation A, the inner ring member 14 by the letter designation B and the backer ring member 16 by the letter designation C.

Each of the ring members 12, 14 and 16 is a cylindrically shaped member, has a hollow interior and has a spreading gap 18. The spreading gaps 18 are indexed as shown with the ring members 12, 14 and 16 being rotationally disposed so that each spreading gap 18 is overlapped by a portion of one of the other ring members. While the present invention is not limited to the use of rings that are made of graphite composition, that is, a composition of compacted carbon in an appropriate binder or matrix having sufficient strength as a sealing ring at services of high temperatures (e.g., 500° F. to 1200° F. for a typical, desirable range of gas turbine pneumatic valve applications), the capability of graphite rings makes such composition preferable to other materials in high temperature, low friction service requirements. As known, the dimensions of each seal ring assembly are determined by the required service, and certain compromises in all ring thicknesses of the ring seal assembly 10 must be made to accommodate the constraint imposed by the limited stress allowable for installation of graphite sealing rings and similar sealing ring materials. These compromises typically result in small ring land contact areas with the resultant high leakage between the piston and seal ring assembly.

Figure 2:
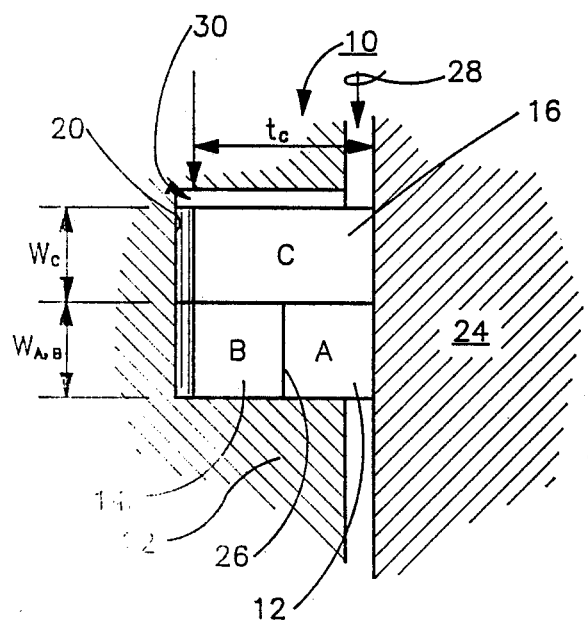
FIG. 2 is a diagrammatic representation in cross section of the prior art three-piece split ring seal assembly of FIG. 1 as supported in a piston groove and in sealing contact with a cylinder wall.

The seal ring member 12, the inner ring member 14 and the backer ring member 16 are depicted in FIG. 2 in a piston groove 20 which is disposed about the perimeter of a piston 22. As depicted, the seal ring member 12(A) and the backer ring member 16(C) extend from the piston groove 20 to form a common sealing surface which has sealing contact with a cylinder wall 24. Each sealing ring is a curved beam having thickness in the radial direction of the piston 22; an example of such thickness is designated $t_c$ which represents the thickness of the backer ring member 16(C) in FIG. 2. The width of the backer ring member 16(C) is designated $W_c$, and the widths of the seal ring member 12 and the inner ring member 14, being equal, are designated $W_{A,B}$.

The ring land, that portion of a ring seal assembly 10 engaging the piston groove 20, is equal to the total thickness $t_c$ of the ring seal assembly 10 less the piston 22 to cylinder wall 24 clearance. The seal ring member 12 is disposed in external juxtapositional contact with the inner ring member 14 at a common boundary or seam 26.

The ring seal assembly 10 is a unidirectional seal, and in the position depicted in FIG. 2, the high pressure side is designated by the numeral 28. The backer ring member 16 overlays the seam 26 between the seal ring member 12 and the inner ring member 14, and prior art designs determine the thickness $t_c$ of the backer ring member 16 to be substantially equal to the combined thicknesses of the seal ring member 12 and inner ring member 14.

It will be noted that a channel 30 is formed along the top (or noncontacting axial) surface of the backer ring member 16(C), and between the back (or inner radial) surfaces of the inner ring member 14(B), the backer ring member 16(C) and the radial surface of the piston groove 20. It will be apparent that gaseous flow exerted on the high pressure side 28 can find a leakage path into the channel 30, and to a much lesser degree, through the spreading gaps 18, overlapping flat surfaces of the rings, the ring land contact area, and ring and cylinder contact areas.

In the conventional ring seal assembly 10 just described, and as mentioned above, the dimensions of the channel 30 are usually quite small. Accordingly, although drawn as being rather large in FIG. 2, the channel 30 is usually on the order of ten to twenty thousands of an inch and presents an unfortunate dumping ground of sorts which can collect particulates and gunk of various origin, including the high temperature material compounds mentioned above. It is the elimination of the effect of this narrow corridor presented by the channel 30 which the present invention addresses. That is, the purpose of the present invention is to provide a low leakage, low friction, contaminant tolerant seal for use in valves, especially in pneumatic gate valves used in the range of up to about one and one half inches in line size and in sleeve valves up to about 2 inches in line size.

Figure 3:
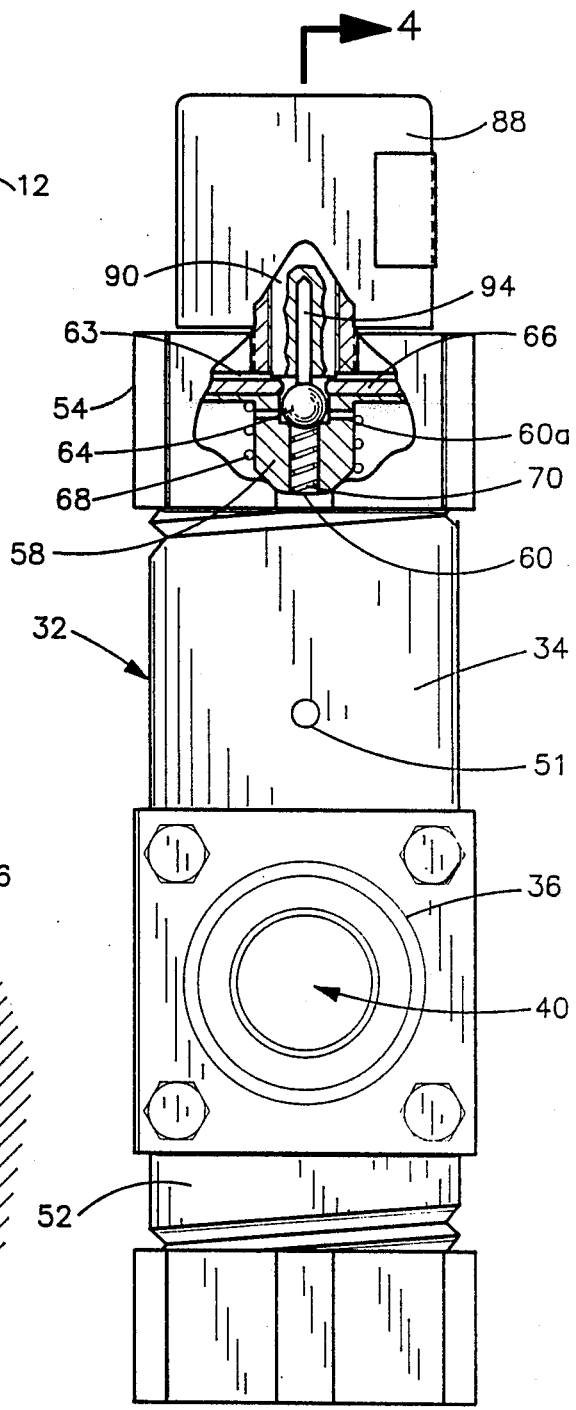
FIG. 3 is a side elevational view of a pneumatic gate valve equipped with a sealing ring assembly constructed in accordance with the present invention.
Figure 4A:
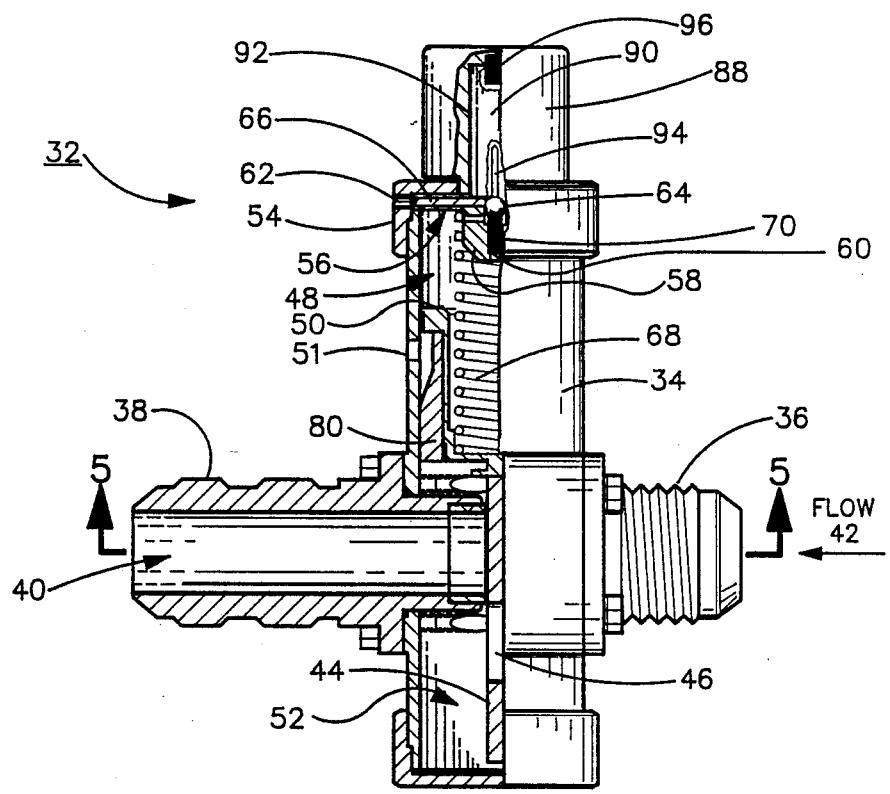
FIG. 4A is a side elevational view of the pneumatic gate valve of FIG. 3 with a partial cutaway along 4—4 in FIG. 3.
Figure 4B:
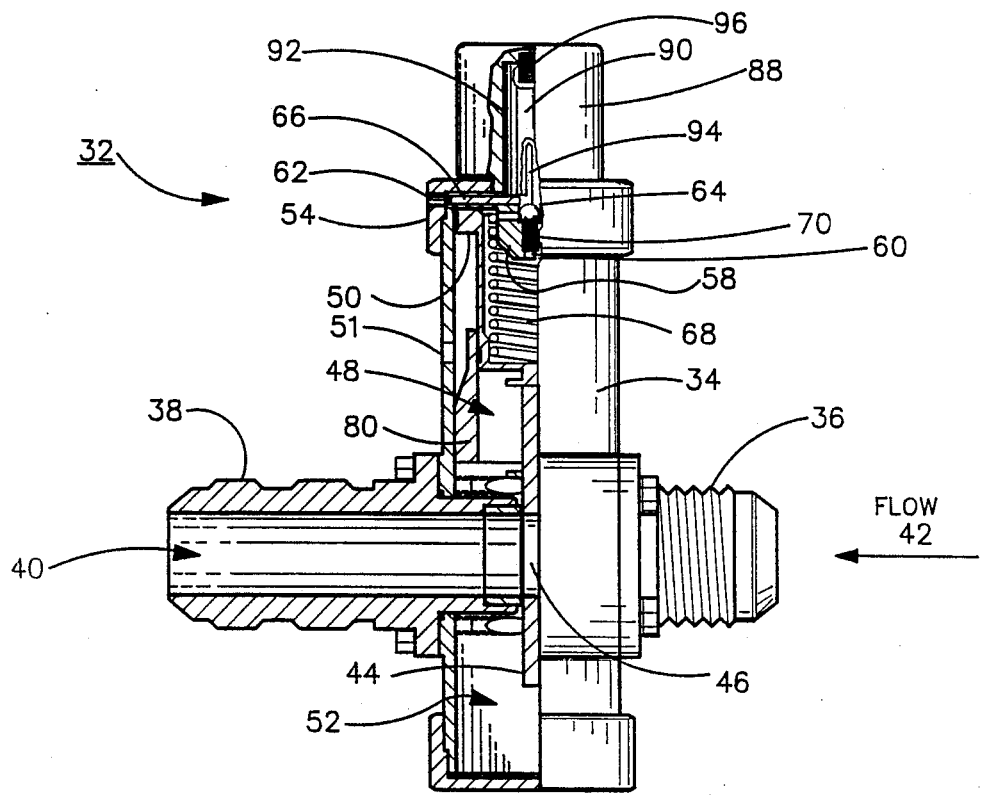
FIG. 4B is a view identical to FIG. 4A with the exception that the gate valve is open to fluid flow.
Figure 5:
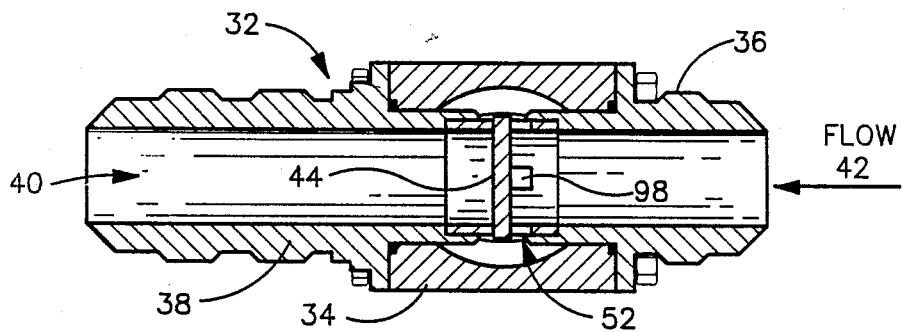
FIG. 5 is a cross sectional, bottom plan view of the pneumatic gate valve of FIG. 3 taken along a line depicted from that at 5—5 in FIG. 4A.

Turning now to FIGS. 3 through 5, shown therein is a valve assembly 32 which is a pneumatic gate valve incorporating the present invention. The valve assembly 32 has a body portion 34 to which are bolted an inlet conduit 36 and outlet conduit 38, having a flow channel 40 (see FIG. 5) through which fluid flow, designated by arrow 42, is permitted or prevented by action of a gate member 44 having a flow aperture 46.

The body portion 34 of the valve assembly 32 has a cylindrically shaped actuation chamber 48 which serves as a cylinder to support a piston member 50, the piston member 50 being movable between a lower position (as shown in FIG. 4A) and an upper position (shown in FIG. 4B). The body portion 34 has a pair of apertures 51 (one of which is shown in FIGS. 3, 4A and 4B) which assure that ambient pressure is maintained about the outer periphery of the piston member 50.

Figure 6:
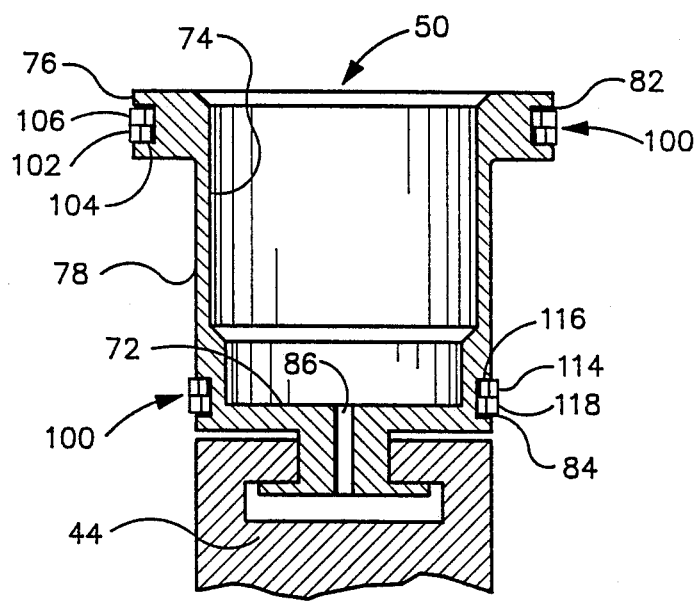
FIG. 6 is a cross sectional, side view of the piston of the pneumatic gate valve of FIG. 3 with the sealing ring assembly of the present invention retained in the piston grooves thereof.

A cross section of the piston member 50 is provided in FIG. 6 in which is shown how the lower end thereof is configured to hangingly support the gate member 44 so that the gate member 44 is raised and lowered with the piston member 50. The gate member 44 is slidingly supported between the inlet conduit 36 and the outlet conduit 38 with appropriate sealing so that the gate member 44 blocks the flow 42 through flow channel 40 when the piston member 50 is in the lower position (FIG. 4A). When the piston member 50 is in the upper position (FIG. 4B), the gate member 44 is raised and the flow aperture 46 thereof is indexed with the flow channel 40 to permit flow 42 to occur.

The body portion 34 of the valve assembly 32 has a gate clearance chamber 52 which receives and covers the distal end of the gate member 44 when it is lowered by the piston member 50.

The upper end of the actuation chamber 48 is closed by a cap member 54 which is threadingly received thereon. Internal to the cap member 54 is a ball seat assembly 56 which has a guide member 58 with a flow channel 60 therethrough. Several bleed ports 62 are provided in the cap member 54 to selectively communicate between ambient and the flow channel 60 by bleeding channels 63 appropriately provided in the guide member 58. The upper portion of the flow channel 60 is flared to support a ball seating member 64, and a ball seat member 66 provides an apertured upper seat for the ball seating member 64 to seal flow to the bleed ports 62. Several radially extending bores 60a prevent the ball seating member 64 from sealing the flow channel 60 when the ball seating member is in a down position.

The lower portion of the guide member 58 is shaped to retain the upper end of a piston spring 68, the lower end of which is supported against the interior of the piston member 50. A ball spring 70 is disposed in the lower portion of the flow channel 60 and biases the ball seating member 64 against the apertured seat of the ball seat member 66.

As shown in FIG. 6, the piston member 50 is cup shaped with an interior bottom portion 72 and an upper open end portion 74 dimensioned to receive the piston spring 68 so that the lower portion thereof is supported against the interior bottom portion 72. The external wall of the piston member 50 has an enlarged upper section 76 which has an outer diameter slidingly received in close proximity to the cylindrically shaped interior wall of the actuation chamber 48. The piston member 50 has a reduced lower section 78 which is slidingly receivable within a sleeve cylinder 80 supported within the lower part of the actuation chamber 48 (FIGS. 4A and 4B) and which has an internal diameter appropriately sized to be in near sliding engagement with the outside diameter of the reduced lower section 78 of the piston member 50.

The upper section 76 of the piston member 50 has an upper piston groove 82, and the lower section 78 has a lower piston groove 84. Disposed through the bottom portion 72 is a flow aperture 86, the purpose of which will be discussed hereinbelow. A loose fitting cotter pin (not shown) is extended through the flow aperture 86 as discussed below.

Returning to FIGS. 4A and 4B, it will be noted that a solenoid assembly 88 is threadingly mounted to a centrally disposed, threaded aperture in the top of the cap member 54. The solenoid assembly 88 is generally of conventional structure and need not be described in great detail, it being sufficient to state that the solenoid assembly 88 has a plunger member 90 slidingly supported in a bore 92, the plunger member 90 having a downwardly extending needle member 94 which is disposed to abut the top of the ball seating member 64. A plunger spring 96 biases the plunger member 90 downwardly so as to press the needle member 94 against the ball seating member 64 to push it away from the apertured seat of the ball seat member 66 when the coil (not shown) of the solenoid assembly 88 is not energized. When the solenoid assembly 88 is energized, the plunger member 90 is caused to be moved upwardly and the ball seating member 64 is allowed to be pressed against the apertured seat of the ball seat member 66 via the ball spring 70, thereby closing flow communication between the flow channel 60 of the ball seat assembly 56 and the bleed ports 62.

Prior to describing the seals used for the piston member 50, a brief description of the operation of the valve assembly 32 will be provided. As noted above, FIG. 4A depicts the valve assembly 32 in its closed position, and FIG. 4B shows the valve assembly 32 opened. It will be noted that the sleeve cylinder 80 shields all except the lower surface of the piston member 50 to pressure in the lower part of the actuation chamber 48 created from the flow channel 40. In FIG. 5 it will be noted that an aperture 98 is provided to communicate fluid pressure to the bottom surface of the piston member 50 from the upstream side of the flow channel 40. The flow aperture 86 in the bottom of the piston member 50 provides fluid communication from beneath the piston member 50 to the space in the actuation chamber 48 above the piston member 50. It will be noted that the upper area of the piston member 50, which is exposed to the pressure in the space above the piston member 50, is greater than the lower area of the piston member 50. In FIG. 4A, the solenoid assembly 88 has been energized to retract the plunger member 90 to permit the ball seating member 64 to reach the apertured upper seal in the ball seat member 66; this prevents pressure bleedoff from the actuation chamber 48 via the bleed ports 62. Since the pressure above and below the piston member 50 is equalized via the flow aperture 86, and the upper area of the piston member 50 is the greatest, the piston member 50 is caused to move to the down position as shown. The cotter key (not shown) which was mentioned above in the flow aperture 86 in the bottom of the piston member 50 is sized to keep the flow aperture 86 free of contaminants; that is, vibration of the valve assembly 32 serves to vibrate the cotter key against the walls of the flow aperture 86 to keep it free from clogging.

The piston spring 68 is not required to move the piston member 50 to its down position, since the piston member will be moved by the pressure differential across it. The piston spring 68 is provided to assure that the piston member 50 does move to the down position, and to thus move the gate member 44 down to close the flow channel 40, in the event of loss of line pressure to the valve assembly 32.

In FIG. 4B the solenoid assembly 88 has been deenergized, permitting the plunger spring 96 to push the plunger member 90 downwardly, the needle member 94 thus pushing the ball seating member 64 away from the apertured upper seat of the ball seat member 66 and exposing the interior of the actuation chamber 48 to the bleed ports 62 via the flow channel 60. This pressure bleedoff out of the bleed ports 62 reduces the pressure on the upper area of the piston member 50, and the differential pressure causes the piston member 50 to move to its upper position. This raises the gate member 44 to index the flow aperture 46 with the flow channel 40 to permit fluid flow 42 therethrough.

Figure 7:
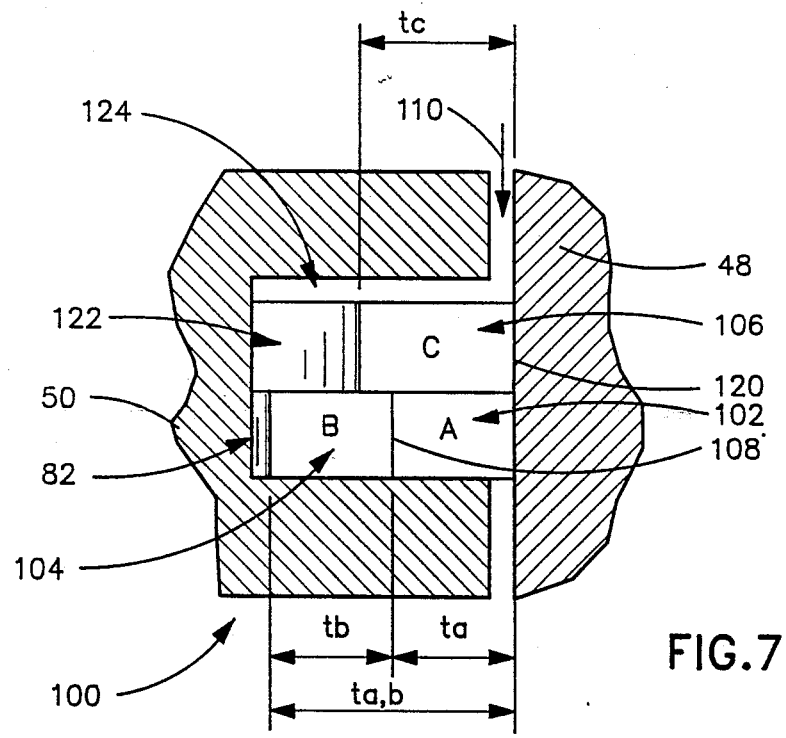
FIG. 7 is an enlarged view of the top rings of the sealing ring assembly shown in FIG. 6.
Figure 8:
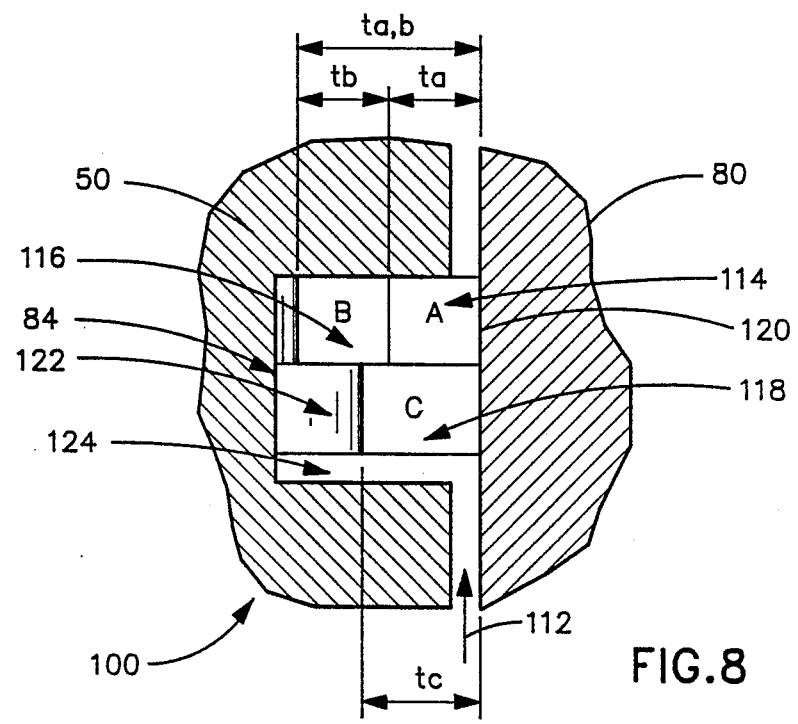
FIG. 8 is an enlarged view of the bottom rings of the sealing ring assembly shown in FIG. 6.

Having completed the above description of the structure and operation of the valve assembly 32, a description of the sealing ring assembly of the present invention will be provided with reference to FIGS. 6 through 8. A sealing ring assembly 100 is depicted by the sealing rings mounted in the upper piston groove 82 and the lower piston groove 84. Each of these ring sets of the sealing ring assembly 100 is similar to the prior art sealing ring assembly 10 discussed hereinabove with reference to FIGS. 1 and 2, with the very important exceptions now to be noted.

Referring to the sealing rings of the sealing ring assembly 100 that are disposed in the upper piston groove 82, it will be noted that the sealing ring assembly comprises a seal ring member 102, an inner ring member 104 and a backup ring member 106. For clarity, these ring members are also designated by alphabetical designations as follows: the seal ring member 102 is also referenced by the letter designation A; the inner ring member 104 by the letter designation B; and the backer ring member 106 by the letter designation C, in FIG. 7. These alphabetical designations will also be used in FIG. 8 discussed below.

Each of the ring members 102, 104 and 106 is a cylindrically shaped member, has a hollow interior and has a spreading gap (not shown) like the spreading gap 18 described hereinabove for the rings of the ring seal assembly 10. The spreading gaps of the ring members 102, 104 and 106 are indexed with the ring members 102, 104 and 106 being rotationally disposed so that each spreading gap is overlapped by a portion of the other ring members. As mentioned, the present invention is not limited to the use of rings that are made of graphite composition; however, the capability of graphite rings makes such composition preferable to other materials in high temperature, low friction service requirements. The dimensions of each seal ring assembly are determined by the required service, and consideration of the constraint imposed by the limited allowable tensile bending stress created during installation of graphite sealing rings (or any other material for these applications) is of critical importance in seal ring assembly design. In order to avoid the aforementioned compromises in leakage associated with bending stress limits in prior art designs, the present invention combines a design improvement with a sequential assembly technique in order to maximize the ring land contact area thereby reducing the high leakage between the piston and seal ring assembly associated with prior art designs.

The seal ring member 102(A) and the backer ring member 106(C) extend from the upper piston groove 82 to form a common sealing surface which has sealing contact with the cylinder wall of the actuation chamber 48. Each sealing ring is a curved beam having thickness in the radial direction of the piston member 50. The terms thickness and width for each of the ring members 102, 104 and 106 will be clear from the discussion provided hereinabove for the sealing ring assembly 10.

The present invention's ring land is equal to the total thickness $t_{a,b}$ of the ring seal assembly 100 less the piston 50 to cylinder wall 80 clearance. The seal ring member 102 is disposed in external juxtapositional contact with the inner ring member 104 at a common seam 108. The present invention's design improvement lies in the selection of the thickness $t_c$ of backer ring 106(C) based on principles of material mechanics and good design practice. As shown in FIG. 7 and FIG. 8, this thickness is virtually identical to prior art designs. Once $t_c$ is selected, $t_a$ is selected to be as large as manufacturing tolerances allow and yet also allow backer ring 106(C) to cover the common seam 108. Since $t_a$ is less than $t_c$, bending stresses are obviously within allowables for seal ring member 102(A). Inner ring member 104(B) thickness $t_b$ is maximized by principles of material mechanics and good design practice and can be as thick or thicker than seal ring member 102(A) because of the selection of a sequential assembly technique that installs inner ring member 104(B) in the piston groove 82 first, then backer ring member 106(C) second, and seal ring member 102(A) last. This sequential assembly technique allows the inner ring member 104(B) freedom to be cocked in the piston groove 82, thereby minimizing the required installation deflection, thus preventing cracks or breakage at installation due to bending stresses.

The sealing ring assembly 100 located in the upper piston groove 82 is a unidirectional seal, and the high pressure side is designated by the numeral 110, which will be the pressure exerted on the upper side of the piston member 50. The backer ring member 106(C) overlays the seam 108 between the seal ring member 102(A) and the inner ring member 104(B).

In the embodiment herein illustrated, sealing is also required from the direction indicated by arrow 112 which is the high pressure side when the piston member 50 is caused to move to its up position. That is, bidirectional sealing is required. Thus, the sealing ring assembly 100 also comprises a seal ring member 114, an inner ring member 116 and a backer ring member 118. In the convention established hereinabove, these ring members are also designated by the alphabetical designations of A, B and C for the ring members 114, 116 and 118, respectively. Since the ring members 114, 116 and 118 of the sealing ring assembly 100 disposed in the lower piston groove 84 are conceptually identical to the ring members disposed in the upper piston groove 82, the discussion of the ring members 102, 104 and 106 in the upper piston groove 82 will also apply to the ring members disposed in the lower piston groove 84.

As shown in FIG. 7, the backer ring member 106 is disposed in the upper piston groove 82 in side juxtaposition to the seal ring member 102 and inner ring member 104, and is coextensive with the seal ring member 102 to form a common sealing surface 120 against the interior cylindrical wall of the actuation chamber 48, although the seal ring member 102 is the primary sealer. The thickness of the backer ring member 106, the seal ring member 102, and inner ring member 104 defined by the present invention's aforementioned design method not only reduce leakage flow and proportionately the amount of contaminants ingested over time, but create a residue deposit groove void 122 between the backer ring member 106 and the piston member 50. The residue deposit groove void 122 can also extend between the inner ring member 104 and the piston member 50. The combined, stacked widths of the rings 102, 104 and 106 are made to be less than the total width of the upper piston groove 82, thereby creating an entry channel 124 which is in fluid communication with the residue deposit groove void 122 and which is exposed to the high pressure side 110, the pressure on the up side of piston member 50 when the piston member 50 is being lowered.

In like manner, the numerals 122 and 124 are used in FIG. 8 to designate the residue deposit groove void and the entry channel formed by the rings 114, 116 and 118 in the lower piston groove 84. In FIG. 8, the entry channel 124 is exposed to the high pressure side 112 which is the pressure beneath the piston member 50 when the piston member 50 is being raised.

In operation, line pressure to the valve assembly 32 pressurizes the sealing ring assembly 100 and expands the rings thereof outwardly against the inner wall of the actuation chamber 48 and the sleeve cylinder 80 while simultaneously pushing all rings toward the low pressure side of the piston 50. In this position the spreading gaps of the seal rings 102, 114 are completely covered by the inner rings 104, 116 and backer rings 106, 118, respectively, thus preventing airborne contaminants entering the flow channel 40 in the inlet conduit 36 from getting to the ring gaps of the seal rings 102, 114. Also, since tests indicate that the seal ring members 102 and 114 wear at a faster rate than backer ring members 106 and 118, the common seam 108 and its analog in FIG. 8 will always be completely covered during the valve service life, thus insuring that contaminants carried by leakage flow are prevented from entering the seal ring 102 and 114 gaps. Since the seal rings 102, 114 block leakage flow for the inner ring members 104, 116 and backer ring members 106, 118, contaminants carried by leakage flow are prevented from entering the ring gaps of the inner and backer rings. Contaminants borne by flow to the residue deposit groove void 122 and to the entry channel 124 have much more space to accumulate than that of previous seal designs. This increased accumulation space and the shielded seal ring gaps increase the life of the sealing ring assembly 100 and provide a more reliable valve assembly in high temperature, high contaminant service.

While a typical three-piece ring seal assembly offers unidirectional sealing, the combination of the upper and lower three-piece ring seal assemblies provided by the sealing ring assembly 100 herein offers bidirectional sealing between the piston 50 and the body portion 34 of superior integrity for low pressure, high temperature service.

It is clear that the present invention is well adapted to carry out the objects and to attain the ends and advantages mentioned herein as well as those inherent in the invention. While a presently preferred embodiment of the invention has been described for the purposes of this disclosure, numerous changes can be made which will readily suggest themselves to those skilled in the art and which are encompassed within the spirit of the invention disclosed and as defined in the appended claims.

What is claimed is:

1. A sealing ring assembly supported by a piston in a piston groove and extensive therefrom for sealing contact with a cylinder wall confining the piston, the sealing ring assembly comprising:
   an inner ring member disposed in the piston groove;
   a seal ring member disposed in the piston groove in external juxtaposition to the inner ring member; and
   a backer ring member disposed in the piston groove in side juxtaposition to the inner ring member and the seal ring member, the backer ring member coextensive with the seal ring member to form a common sealing surface against the cylinder wall, the thickness of the backer ring member being determined to be greater than the thickness of the seal ring member and less than the combined thicknesses of the seal member and the inner ring member so that the ring land contact area is maximized and so that a substantial residue deposit groove void is formed between the backer ring member and the piston.

2. The sealing ring assembly of claim 1 wherein the ring members are of graphite composition.

3. The sealing ring assembly of claim 1 wherein each of the ring members has a spreading gap, the ring members rotationally disposed so that each spreading gap is overlapped by a portion of one of the other ring members.

4. The sealing ring assembly of claim 3 wherein the ring members are disposed so that the widths of the inner ring member and the seal ring member are substantially equal and the axial surfaces of these rings in juxtapositional contact with the backer ring member are coplanar.

5. A sealing ring assembly of claim 1 wherein the piston has a second piston groove and wherein the sealing ring assembly comprises:
   a second inner ring member disposed in the second piston groove;
   a second seal ring member disposed in the second piston groove in external juxtaposition to the second inner ring member; and
   a second backer ring member disposed in the second piston groove in side juxtaposition to the second inner ring member and the second seal ring member, the second backer ring member coextensive with the second seal ring member to form a common sealing surface against the cylinder wall, the thickness of the second backer ring member being determined to be greater than the thickness of the second seal ring member and less than the combined widths of the second seal ring member and the second inner ring member so that the ring land contact area is maximized and so that a substantial second residue deposit groove void is formed between the second backer ring member and the piston.

6. The sealing ring assembly of claim 5 wherein the first and second ring members are of graphite composition.

7. The sealing ring assembly of claim 5 wherein each of the first and second ring members has a spreading gap, the first and second ring members rotationally disposed so that each spreading gap is overlapped by a portion of the first or second ring members, respectively.

8. The sealing ring assembly of claim 7 wherein the first and second ring members are disposed so that the widths of the first and second inner ring members and the first and second seal ring members are substantially equal, and the axial surfaces of these rings in juxtapositional contact with the first and second backer ring members are coplanar.

9. A sealing ring assembly supported by a piston in a piston groove and extensive therefrom for sealing contact with a cylinder wall confining the piston, the sealing ring assembly comprising:
   an inner ring member disposed in the piston groove;
   a seal ring member disposed in the piston groove in external juxtaposition to the inner ring member; and
   a backer ring member disposed in the piston groove in side juxtaposition to the inner ring member and the seal ring member, the backer ring member coextensive with the seal ring member to form a common sealing surface against the cylinder wall, the thickness of the backer ring member being determined to be greater than the thickness of the seal ring member and less than the combined thicknesses of the seal member and the inner ring member so that the ring land contact area is maximized and so that a residue deposit groove void is formed between the backer ring member and the piston;
   wherein the ring members are of graphite composition, each of the ring members having a spreading gap, the ring members rotationally disposed so that each spreading gap is overlapped by a portion of one of the other ring members, the ring members being disposed so that the widths of the inner ring member and the seal ring member are substantially equal and the axial surfaces of these rings in juxtapositional contact with the backer ring member being coplanar; and
   wherein the ring members are disposed in the piston groove and the widths of the seal ring member and the backer ring member are selectively determined to provide an entry channel in communication with the residue deposit groove void.

10. The sealing ring assembly of claim 9 wherein the ring members are oriented in the piston groove to expose the entry channel to the high pressure side of the piston.

11. A sealing ring assembly supported by a piston in a piston groove and extensive therefrom for sealing contact with a cylinder wall confining the piston, the sealing ring assembly comprising:
  a first inner ring member disposed in the first piston groove;
  a first seal ring member disposed in the first piston groove in external juxtaposition to the first inner ring member;
  a first backer ring member disposed in the first piston groove in the side juxtaposition to the first inner ring member and the first seal ring member, the first backer ring member coextensive with the first seal ring member to form a common sealing surface against the cylinder wall, the thickness of the first backer ring member determined to be greater than the thickness of the first seal ring member and less than the combined thicknesses of the first seal member and the first inner ring member so that the ring land contact area is maximized and so that a first residue deposit groove void is formed between the first backer ring member and the piston;
  a second inner ring member disposed in the second piston groove;
  a second seal ring member disposed in the second piston groove in external juxtaposition to the second inner ring member; and
  a second backer ring member disposed in the second piston groove in side juxtaposition to the second inner ring member and the second seal ring member, the second backer ring member coextensive with the second seal ring member to form a common surface against the cylinder wall, the thickness of the second backer ring member being determined to be greater than the thickness of the second seal ring member and less than the combined widths of the second seal ring member and the second inner ring member so that the ring land contact area is maximized and so that a second residue deposit groove void is formed between the second backer ring member and the piston;
  wherein the first and second ring members are of graphite composition, each of the first and second ring members having a spreading gap, the first and second ring members rotationally disposed so that each spreading gap is overlapped by a portion of the first or second ring members, respectively, the first and second ring members being disposed so that the widths of the first and second inner ring members and the first and second seal ring members are substantially equal, and the axial surfaces of these rings in juxtapositional contact with the first and second backer ring members being coplanar; and
  wherein the first and second ring members are disposed in the first and second piston grooves, respectively, and the widths of the first and second seal ring members and the first and second backer ring members are selectively determined to provide entry channels in communication with the first and second residue deposit groove voids, respectively.

12. The sealing ring assembly of claim 11 wherein the first and second ring members are oriented in the first and second piston grooves, respectively, to expose the entry channels formed therein to opposite directions so that sealing is achieved in either direction.

13. A sealing ring assembly supported by a piston in a piston groove and extensive therefrom for sealing contact with a cylinder wall confining the piston, the sealing ring assembly comprising:
  an inner ring member disposed in the piston groove;
  a seal ring member disposed in the piston groove in external juxtaposition to the inner ring member; and
  a backer ring member disposed in the piston groove in side juxtaposition to the inner ring member and the seal ring member, the backer ring member coextensive with the seal ring member to form a common sealing surface against the cylinder wall, the thickness of the backer ring member being determined to be greater than the thickness of the seal ring member and less than the combined thickness of the seal member and the inner ring member so that the ring land contact area is maximized and so that a residue deposit groove void is formed between the backer ring member and the piston, each of the ring members having a spreading gap, the ring members rotationally disposed so that each spreading gap is overlapped by the other ring members, the widths of the inner ring member and the seal ring member being substantially equal and the axial surfaces of the rings which are in juxtapositional contact with the backer ring member being coplanar, the widths of the seal ring member and the backer ring member being selectively determined to provide an entry channel to communication with the residue deposit groove void.

14. A sealing ring assembly supported by a piston in a piston groove and extensive therefrom for sealing contact with a cylinder wall confining the piston, the sealing ring assembly comprising:
  a first inner ring member disposed in the first piston groove;
  a first seal ring member disposed in the first piston groove in external juxtaposition to the first inner ring member;
  a first backer ring member disposed in the first piston groove in side juxtaposition to the first inner ring member and the first seal ring member, the first backer ring member coextensive with the first seal ring member to form a common sealing surface against the cylinder wall, the thickness of the first backer ring member being determined to be greater than the thickness of the first seal ring member and less than the combined thicknesses of the first seal member and the first inner ring member so that the ring land contact area is maximized and so that a first residue deposit groove void is formed between the first backer ring member and the piston;
  a second inner ring member disposed in the second piston groove;
  a second seal ring member disposed in the second piston groove in external juxtaposition to the second inner ring member; and
  a second backer ring member disposed in the second piston groove in side juxtaposition to the second inner ring member and the second seal ring member, the second backer ring member coextensive with the second backer ring member to form a common sealing surface against the cylinder wall, the thickness of the second backer ring member being determined to be greater than the thickness of the second seal ring member and less than the combined widths of the second seal ring member and the second inner ring member so that the ring land contact area is maximized and so that a second residue deposit groove void is formed between the second backer ring member and the piston, each of the first and second ring members having a spreading gap, the first and second ring members rotationally disposed so that each spreading gap is overlapped by a portion of the first or second ring members, respectively, the first and second ring members being disposed so that the widths of the first and second inner ring members and the first and second seal ring members are substantially equal, the axial surfaces of the rings in juxtapositional contact with the first and second backer ring members being coplanar, the widths of the first and second seal ring members and the first and second backer ring members being selectively determined to provide entry channels in communication with the first and second residue deposit groove voids, respectively.

* * * * *